United States Patent
Heirman et al.

(10) Patent No.: US 10,173,165 B2
(45) Date of Patent: Jan. 8, 2019

(54) METHOD AND DEVICE FOR STRIPPING A GAS FROM A GAS MIXTURE USING A VENTURI EJECTOR

(71) Applicant: ATLAS COPCO AIRPOWER, naamloze vennootschap, Wilrijk (BE)

(72) Inventors: Peter Heirman, Wilrijk (BE); Geurt Aalderink, Wilrijk (BE)

(73) Assignee: ATLAS COPCO, AIRPOWER, NAAMLOZE VENNOOTSCHAP, Wilrijk (BE)

( * ) Notice: Subject to any disclaimer, the term of this patent is extended or adjusted under 35 U.S.C. 154(b) by 780 days.

(21) Appl. No.: 14/430,968

(22) PCT Filed: Oct. 1, 2013

(86) PCT No.: PCT/BE2013/000051
§ 371 (c)(1),
(2) Date: Mar. 25, 2015

(87) PCT Pub. No.: WO2014/053030
PCT Pub. Date: Apr. 10, 2014

(65) Prior Publication Data
US 2015/0251129 A1  Sep. 10, 2015

(30) Foreign Application Priority Data
Oct. 5, 2012 (BE) .................................. 2012/0660

(51) Int. Cl.
| | |
|---|---|
| *B01D 53/14* | (2006.01) |
| *B01D 53/18* | (2006.01) |
| *B01D 53/26* | (2006.01) |
| *B01D 53/52* | (2006.01) |
| *B01D 53/80* | (2006.01) |

(52) U.S. Cl.
CPC ..... *B01D 53/1425* (2013.01); *B01D 53/1468* (2013.01); *B01D 53/1475* (2013.01);
(Continued)

(58) Field of Classification Search
None
See application file for complete search history.

(56) References Cited

U.S. PATENT DOCUMENTS

| | | |
|---|---|---|
| 2,127,571 A | 8/1938 | Pardee, Jr. |
| 3,648,434 A | 3/1972 | Gravis et al. |

(Continued)

FOREIGN PATENT DOCUMENTS

| | | |
|---|---|---|
| DE | 10 2009 009753 A1 | 9/2010 |
| DE | 10 2009 034548 A1 | 4/2011 |

(Continued)

OTHER PUBLICATIONS

International Search Report (ISR) dated Feb. 4, 2014, for PCT/BE2013/000051.

*Primary Examiner* — Duane Smith
*Assistant Examiner* — Phillip Y Shao
(74) *Attorney, Agent, or Firm* — Bacon & Thomas, PLLC (57) ABSTRACT

Method for extracting a gas from a gas mixture by:
during a purification step, bringing a first sorption medium into contact with the gas mixture in order to extract the gas from the gas mixture, whereby an enriched first sorption medium is formed in which the gas is at least partially sorbed;
during a regeneration step, bringing a second sorption medium into contact with the enriched first sorption medium in order to extract the gas from the enriched liquid first sorption medium;
whereby for the contact in the purification step and/or in the regeneration step use is made of a separate venturi ejector.

14 Claims, 3 Drawing Sheets

(52) U.S. Cl.
CPC ......... *B01D 53/1493* (2013.01); *B01D 53/18* (2013.01); *B01D 53/263* (2013.01); *B01D 53/526* (2013.01); *B01D 53/80* (2013.01); *B01D 2252/204* (2013.01); *B01D 2252/2021* (2013.01); *B01D 2252/2026* (2013.01); *B01D 2252/2028* (2013.01); *B01D 2252/20494* (2013.01); *B01D 2252/30* (2013.01); *B01D 2252/50* (2013.01); *B01D 2258/05* (2013.01); *Y02C 10/06* (2013.01)

(56) References Cited

U.S. PATENT DOCUMENTS

| | | | | |
|---|---|---|---|---|
| 4,366,131 A | * | 12/1982 | Fox | B01D 53/52 |
| | | | | 423/231 |
| 4,411,846 A | | 10/1983 | Ulrich et al. | |
| 4,828,768 A | * | 5/1989 | Talmor | B01D 47/10 |
| | | | | 261/116 |
| 2011/0217218 A1 | * | 9/2011 | Gupta | B01D 53/1462 |
| | | | | 423/228 |
| 2011/0244555 A1 | * | 10/2011 | Gunther | B01D 53/1425 |
| | | | | 435/266 |

FOREIGN PATENT DOCUMENTS

| | | |
|---|---|---|
| EP | 1582250 A2 | 10/2005 |
| JP | S52-68071 A | 6/1977 |
| JP | 2005-049041 A | 2/2005 |
| JP | 2008-000728 A | 1/2008 |
| WO | 99/13962 A1 | 3/1999 |
| WO | 2011/109359 A1 | 9/2011 |

\* cited by examiner

METHOD AND DEVICE FOR STRIPPING A GAS FROM A GAS MIXTURE USING A VENTURI EJECTOR

BACKGROUND OF THE INVENTION

The present invention relates to a method for extracting a gas from a gas mixture that contains the gas.

Such a method is already known in the sector of the purification of untreated biogas, which for example comes from the anaerobic digestion of waste sludge, organic waste, manure, and similar. This untreated biogas primarily consists of methane and typically 30% to 50% $CO_2$ gas.

In order to be able to be used as a natural gas replacement fuel and injected into the natural gas network, this untreated biogas must be purged of the $CO_2$ as much as necessary. The thus purified gas is also called green gas or biomethane because upon combustion it does not contribute to global warming, in contrast to what happens with the combustion of fossil fuels.

A method is already known by which the untreated biogas is purified by bringing it into contact with a sorption medium in the form of an absorption liquid that has the property of absorbing the $CO_2$ gas, after which the purified biogas and the liquid sorption medium with the $CO_2$ sorbed therein can be removed separately.

According to another known method for extracting $CO_2$ from a gas mixture, use is made of a venturi ejector to bring the gas mixture to be purified in contact with a liquid sorption medium that is able to sorb the gas to be extracted from the gas mixture upon contact with the gas mixture in the venturi ejector.

With this known method it is also known that the liquid sorption medium is regenerated by extracting the sorbed $CO_2$ from it so that the sorption medium can be used again to purify untreated biogas.

The regeneration is done by heating and requires a lot of energy as the quantity of heat energy needed to regenerate it is proportional to the quantity of $CO_2$ that must be removed.

This heat can be partially recovered for low temperature applications if necessary on location, but the heat consumption nevertheless remains a disadvantage.

Other known techniques such as washing out with water, PSA (Pressure Swing Absorption, TSA (Temperature Swing Absorption) and the use of selective membranes require less heat energy, but then require a lot of compressor power and thus a lot of energy for driving the compressors. These last techniques also remove $CO_2$ from the untreated biogas less efficiently, such that the quality of the green biomethane supplied is lower and more methane is also lost, such that a post-treatment of the extracted $CO_2$ gas, which still contains methane, is necessary. This post-treatment is necessary because methane emissions contribute to global warming.

The invention not only relates to the purification of untreated biogas, but more generally to the extraction of a certain gas from a gas mixture.

Another typical example of this is the drying of moist air or a moist gas, whereby water vapour has to be extracted from the air.

Dryers are already known that are used for this purpose that operate according to the principle of cold drying or which make use of an absorbing mass through which the air to be dried or gas to be dried is driven.

These known techniques are voluminous and cause a pressure loss of the gas. As such a gas then has to be compressed such a pressure loss results in substantially higher compression energy.

SUMMARY OF THE INVENTION

The purpose of the present invention is to provide a solution to at least one of the aforementioned and other disadvantages.

To this end of the invention concerns a method for extracting a gas from a gas mixture, whereby the method comprises the following steps:
   the provision of a liquid first sorption medium, which upon contact with the gas mixture can at least partially sorb the gas to be extracted;
   during a purification step, bringing this first sorption medium into contact with the gas mixture by guiding them together through a purification stage to have the gas to be extracted at least partially sorbed from the gas mixture by the first sorption medium due to the mutual contact, in order to be left with a purified gas mixture with less gas to be extracted and an enriched liquid first sorption medium in which the gas to be extracted from the gas mixture is at least partially sorbed;
   the provision of a gaseous second sorption medium that can at least partially extract the gas to be extracted from the enriched liquid first sorption medium upon contact with this enriched liquid sorption medium;
   during a regeneration step, bringing this gaseous second sorption medium into contact with the enriched liquid first sorption medium formed during the aforementioned purification step by guiding them together through a regeneration stage, whereby, due to the mutual contact, the sorbed gas to be extracted in the enriched first sorption medium is at least partially sorbed by the second sorption medium and whereby at the output of the regeneration stage an at least partially regenerated liquid first sorption medium is formed that can be reused for a subsequent purification step;
   whereby use is made of a venturi ejector with a liquid input and a gas input for the regeneration step, whereby the enriched liquid first sorption medium originating from the purification step is supplied under pressure to the liquid input of this venturi ejector and the gaseous second sorption medium is drawn in via the gas input of this venturi ejector for the contact between the enriched first sorption medium and the second sorption medium.

The extraction of the gas to be extracted is done intensively in the case of the regeneration step thanks to the intense frictional contact between the liquid and the gas drawn in.

The method provides the advantage that the regeneration proceeds efficiently because, due to the formation of very many small droplets, a large contact surface is created between the liquid first sorption medium and the gas, and also the diffusion length of the gas to be extracted in the first sorption medium is very small. Moreover, due to the large speed difference between the droplets and the gas, the gas on the contact surface between the liquid and gas is continually replenished.

Due to the action of the venturi ejector, during the supply of the liquid enriched first sorption medium an underpressure occurs in the venturi ejector that is utilised to supply the gaseous second sorption medium due to suction and without other means such as a compressor or other supply means being required to this end.

Preferably for the purification step use is made of a separate second venturi ejector with a liquid input and a gas input, whereby the first sorption medium is supplied under pressure to the liquid input of this venturi ejector and the gas mixture to be purified is drawn in via the gas input of this venturi ejector for the contact between the first sorption medium and the gas mixture.

This provides the advantage that efficient purification occurs due to the intense contact between the gas to be purified and the liquid first sorption medium.

Moreover, due to the action of the venturi ejector of the purification stage, the pressure of the gas mixture in the first venturi ejector is increased, which helps the gas to be extracted from the gas mixture to be sorbed better by the sorption medium.

In particular the method is extremely suitable for extracting $CO_2$ from untreated biogas, whereby the invention means that a large proportion of the $CO_2$ is removed from the untreated biogas and a relatively pure biomethane is thus obtained, also with an increased pressure with respect to the pressure of the untreated biogas supplied, which is also favourable as an increased pressure is needed for the further purification of the biogas.

Preferably in this specific case of biogas, a liquid first sorption medium is used based on a mixture of amines or amine groups containing compounds or salts thereof. A first sorption medium that is not sensitive to oxidation, for example an amino salt, is preferred here.

In this specific case of biogas, for example, the ambient air or another (inert) gas is used as a second sorption medium in the regeneration stage. It is known that the ambient air only contains approx. 0.04% $CO_2$ and thus can sorb a large quantity of $CO_2$.

The method preferably proceeds according to a continuous process whereby the first sorption medium is guided around a circuit, respectively from a first reservoir via a first venturi ejector to a second reservoir to purify the gas mixture that is drawn in by the first venturi ejector, and then further via a second venturi ejector back to the first reservoir, whereby the second sorption medium is drawn in by the second venturi ejector.

An advantage is that the gas mixture to be treated can be supplied continuously, whereby the first sorption medium is driven around the circuit continuously.

Preferably at least one additional purification is applied in one or more steps, whereby the first sorption fluid originating from the first reservoir at least partially sorbs the gas to be extracted in the additional purification and is then supplied under pressure to the liquid input of the ejector of the first venturi ejector and whereby the at least partially purified gas mixture originating from the second reservoir is further purified in the additional purification and is tapped off from there via a gas output.

In this way the gas mixture flows in the opposite direction to the sorption medium, this is in contrast to the application with only a single purification step, such that a higher degree of purification can be achieved.

This additional purification preferably makes use of an additional venturi ejector followed by an additional reservoir that are provided in the circuit between the first reservoir and the first venturi ejector, whereby the first sorption fluid from the first reservoir is further pumped through the additional venturi ejector to the additional reservoir, whereby it is mixed with the at least partially purified gas originating from the second reservoir whose gas output is connected to the gas input of the additional venturi ejector, and whereby the further purified gas is tapped off from the additional reservoir via a gas output, which leads to a high efficiency of the additional purification. In the same way the regeneration can be done in a number of successive steps with a favourable effect.

The invention also relates to a device for extracting a gas from a gas mixture by contact with a liquid first sorption medium that can at least partially sorb the gas to be extracted from the gas mixture upon contact with the gas mixture whereby an enriched first sorption medium is formed, whereby the device comprises a circuit in which the liquid first sorption medium is driven around from a first reservoir through a purification stage to a second reservoir, and from there through a regeneration stage back to the first reservoir, whereby the purification stage is equipped to bring the gas mixture into contact with the first sorption medium, while the regeneration stage is equipped to bring the enriched first sorption medium originating from the purification stage into contact with a gaseous second sorption medium that, upon contact, can at least partially extract the gas to be extracted from the enriched liquid first sorption medium, whereby the regeneration stage comprises a venturi ejector with a liquid input connected to the second reservoir for the supply of the enriched liquid first sorption medium and a gas input for the supply of the gaseous second sorption medium and a liquid output that leads to the first reservoir.

The device enables the advantages of the method according to the invention described above to be realised with relatively simple means.

BRIEF DESCRIPTION OF THE DRAWINGS

With the intention of better showing the characteristics of the invention, a few preferred embodiments of a device and a method thereby applied according to the invention are described hereinafter by way of an example, without any limiting nature, with reference to the accompanying drawings, wherein.

Figure 1:
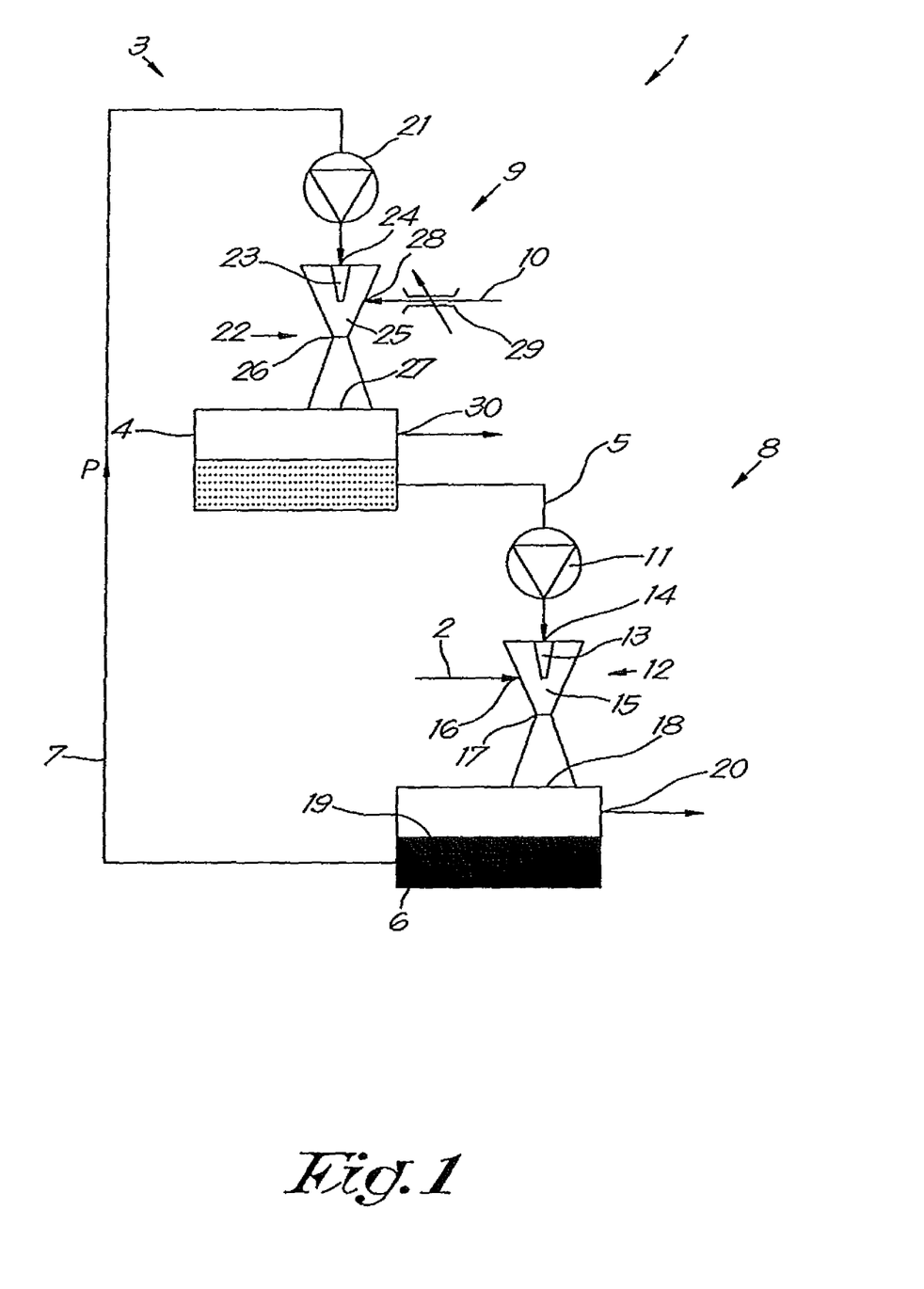
FIG. 1 schematically shows a device according to the invention.

The device 1 shown in FIG. 1 concerns a device for extracting a gas from a gas mixture that is supplied by a supply pipe 2.

DETAILED DESCRIPTION OF THE INVENTION

The device 1 comprises a circuit 3 to which the supply pipe 2 is connected and in which a liquid first sorption medium circulates from a first reservoir 4 via a first pipe 5 through a second reservoir 6 and via a second pipe back to the first reservoir 4 in the flow direction of the arrow P. This first sorption medium presents the property that it can sorb the gas to be extracted from the gas mixture, for example by absorption or adsorption, when it is brought into contact with this gas mixture, whereby for example the partial pressure of the gas to be extracted in the first sorption medium is lower than the partial pressure of the gas to be extracted in the gas mixture.

The aforementioned circuit 3 comprises two successive stages in the flow direction P, respectively a purification stage 8 in which the gas mixture is brought into contact with the first sorption medium from the first reservoir 4 in order to sorb the gas to be extracted, and a regeneration stage 9 in which the enriched liquid first sorption medium from the second reservoir 6 is brought into contact with a gaseous second sorption medium that is supplied via a second supply pipe 10 and which presents the property that it can again extract the gas sorbed in the purification stage 8 by the first sorption medium from this first sorption medium, for example by desorption. The second sorption medium is preferably chosen such that the partial pressure of the gas to be extracted in the second sorption medium is lower than the partial pressure of the gas to be extracted in the enriched liquid first sorption medium.

The purification stage 8 comprises a first pump 11 that pumps the first sorption medium from the first reservoir 4 via the pipe 5 and a first venturi ejector 12 to the second reservoir 6.

The first venturi ejector 12 is equipped in a known way with an ejector 13 with a liquid input 14 for the liquid sorption medium that is supplied under pressure by the pump 10 from the first reservoir 4 and which is injected by the ejector 13 into a mixing chamber 15 of the venturi ejector 12.

The mixing chamber 15 is provided with a suction gas input 16 to which the supply pipe 2 of the gas mixture to be treated is connected.

The venturi ejector 12 defines a flow channel that narrows in the mixing chamber 15 in the flow direction up to a 'venturi' 17 where the flow cross-section of the flow channel is minimum, after which the flow channel again becomes wider ending, via an output 18, in the aforementioned second reservoir 6 above the level 19 of the liquid sorption medium in this reservoir 6.

The second reservoir 6 is provided with a gas output 20 through which the purified gas mixture can be removed.

The regeneration stage 9 comprises a second pump 21 that leads the liquid first sorption medium from the second reservoir 6, together with the gas to be extracted sorbed therein, via the second pipe 7 and a second venturi ejector 22 back to the first reservoir 4.

The second venturi ejector 22 is, analogous to the first venturi ejector 12, equipped with an ejector 23 with a liquid input 24 connected to the pipe 7, a mixing chamber 25, a venturi 26 and an output 27 that leads to the first reservoir 4.

The mixing chamber 25 is provided with a suction gas input 28 connected to the aforementioned supply pipe 10 of the gaseous second sorption medium.

In the example shown a throttle valve 29 is provided, that is preferably adjustable, in the supply pipe 10 of the second sorption medium.

The device 1 enables the method of the invention to be applied in a simple way, as set out hereinafter.

When the pump 11 is driven, the liquid first sorption medium from the reservoir is pumped through the ejector 13 of the venturi ejector 12, such that this first sorption medium is injected under pressure into the mixing chamber 15.

Hereby the gas mixture is drawn in via the supply pipe 2 in a known way, due to the entrainment effect of the injected liquid droplets, and brought into intense contact with the liquid first sorption medium and mixed by the friction between the gas mixture and the first sorption medium.

As a result, during a purification step in the purification stage 8, the gas to be extracted is extracted from the gas mixture and is sorbed by the first sorption medium whose concentration of sorbed gas to be extracted increases as a result.

In this respect there is a case of a rich or enriched liquid first sorption medium that is received at the bottom of the second reservoir 6, and which is characterised by a higher concentration with respect to the poor or depleted first sorption medium in the first reservoir 4.

The remaining gas or gas mixture from which at least a part of the gas to be extracted has been removed from the gas mixture, is received as a purified or partly purified gas in the second reservoir 6 where it separates naturally from the liquid first sorption medium.

Due to the action of the first venturi ejector 12, the purified or partly purified gas at the output 18 of the venturi ejector 12 has a higher pressure than the supplied gas mixture to be purified, such that this gas can be removed separately at an increased pressure via the gas output 20 without the intervention of additional means to increase the pressure.

In view of the increased pressure the reservoir 6 must be constructed as a pressure vessel that can withstand this increased pressure.

A throttle valve and/or pressure-increasing system, not shown in the drawings, can optionally be incorporated in the supply pipe 2 of the gas mixture in order to be able to control and optimise the mix ratio between the gas mixture and the liquid first sorption medium in the first venturi ejector 12.

Due to the drive of the pump 21, in the regeneration stage 9 the enriched first sorption medium is pumped from the second reservoir 6 to the second ejector 23 and injected into the mixing chamber 25 of the second venturi ejector 22.

As a result the second sorption medium is drawn in and brought into close contact with the enriched first sorption medium.

Hereby the gas to be extracted is sorbed by the second sorption medium, during a regeneration step in the regeneration stage 9, from the enriched first sorption medium and a poor or depleted first sorption medium remains with a reduced concentration of sorbed gas to be extracted that is received in the reservoir 4, from where it can be used again for a subsequent purification step in the purification stage 8.

The second sorption medium together with the gas to be extracted sorbed therein is blown out or removed via a gas output 30 from the first reservoir 4 for further processing or usage.

Due to the throttling of the drawn-in gaseous second sorption medium in the throttle valve 29, the partial pressure of the gas to be extracted in the second sorption medium is reduced, such that the sorption capacity of the gas to be extracted in the second sorption medium increases and the regeneration proceeds more efficiently.

A circuit 3 is thus obtained in which the liquid first sorption medium circulates continuously and whereby the gas mixture is continuously drawn in and purified in the purification stage 8 by sorption of the gas to be extracted in the first sorption medium, and whereby a second sorption medium is continuously drawn into the regeneration stage 9 in order to regenerate the first sorption medium with the sorbed gas to be extracted into a reusable first sorption medium.

The efficiency of the purification stage 8 can be further improved by providing the ejector 12 with a connecting piece, not shown in the drawings, between the mixing chamber 15 and output 18 in order to increase the contact time between the gas mixture and the first liquid sorption medium. Likewise the efficiency of the regeneration stage 9 can be further improved by providing an ejector 22 with a connecting piece, not shown in the drawings, between the mixing chamber 25 and output 27 in order to increase the contact time between the second gaseous sorption medium and the first liquid sorption medium.

The efficiency of the method can be further improved by cooling the liquid first sorption medium in the case of an exothermic adsorption or absorption of the gas to be sorbed by the first sorption medium, or heated in the case of an endothermic adsorption or absorption, before being guided through the first venturi ejector 12, and this in order to reduce the partial pressure of the gas to be extracted in the first sorption medium.

An improvement is also possible when the first liquid sorption medium is heated in the case of endothermic desorption, or cooled in the case of exothermic desorption, before being pumped through the second venturi ejector 22.

When simultaneous heating and cooling is applied, it can be useful in this respect to use a heat pump of which one heat exchanger is used for heating and the other heat exchanger is used for cooling, and which pumps the heat developed by the exothermic reaction to the endothermic reaction.

The reservoir 6 and reservoir 4 can be provided with additional means to further improve the method, such as a droplet separator.

The method and device 1 described above can be used advantageously for purifying untreated biogas that is typically a gas mixture of methane and $CO_2$, from which $CO_2$ must be removed to be left with methane that can be used as a fuel to replace natural gas.

To this end preferably a mixture of water and amine is used as a first sorption medium that circulates in the circuit and which is able to sorb $CO_2$ from the biogas.

Hereby enriched amine with an increased $CO_2$ concentration is formed in the second reservoir 6 that is brought into contact in the regeneration stage 9 with a second sorption medium in the form of ambient air that is drawn in from the environment via the supply pipe 10, and which is able to release, by desorption, the $CO_2$ sorbed from the untreated biogas that is present in the enriched amine of reservoir 6.

The $CO_2$ sorbed in the ambient air is then blown out via the gas output 30 together with the ambient air into the environment.

The efficiency of the purification of biogas can be improved by heating the enriched first sorption medium in the second reservoir 6 or in the pipe 7 for the regeneration step in the regeneration stage 9 and by cooling the depleted first sorption medium in the first reservoir 4 or in the pipe 5 for purification in the purification stage 8.

During heating it must be ensured that the temperature does not rise too high in order to prevent oxidation of the amine as the first sorption medium. Alternatively a sorption medium such as amino salt can be chosen that is insensitive or less sensitive to oxidation.

The method can be optimised by experimental and calculated adjustment of the pressures and temperatures, sorption media and similar.

Depending on the application or the requirements, various chemical liquids or liquid mixtures can be used as a first sorption medium such as amine, amino salts, amino acids and this possibly in different concentrations.

In addition to these chemical liquids, physical liquids or liquid mixtures such as methanol, selexol, NMP, and similar can be used as a first sorption medium, as well as hybrid liquids such as sulfinol, amisol, and similar or even new emerging liquids such as ionic liquids.

The first sorption medium can also be a slurry, in other words a mixture of liquid and solid particles, such as iron particles to extract the sulphur from the biogas present as $H_2S$ in the biogas by binding with the iron. The resulting FeS particles have to be filtered out.

The method is not limited to the purification of biogases but can also be used with other gases.

An example of this is the drying of moist air or moist gas that is a gas mixture of dry air and water vapour that can be extracted from the moist air by bringing it into contact, in a purification stage, with a liquid drying agent, e.g., hygroscopic, such as propylene glycol, that acts as a first liquid sorption medium.

The regeneration can be done with ambient air as a second sorption medium in a regeneration stage 9. This requires heating and/or throttling of the pressure with the throttle valve 29 as the partial pressure of water in the ambient air is not always low enough.

This method can be used at higher pressures, for example with compressed air with a pressure of 10 barg (1 Mpa), whereby this compressed air can be dried by application of the invention with propylene glycol, whereby at the same time the pressure of the dried compressed gas can be increased to 11 barg (1.1 Mpa) for example, thanks to the pressure increase in the venturi ejector 12.

Notwithstanding the fact that two pumps 11 and 21 are used in the example of FIG. 1, it is not excluded using only one single pump, whereby one of the two pumps 11 or 22 can be left out.

For example pump 21 can be left out, whereby only pump 11 pumps the first sorption medium 11 around the circuit 3. This single pump 11 ensures a sufficient pressure build-up in the reservoir 6 to be able to make use of this higher pressure to drive the first sorption medium from the second reservoir 6 to the first reservoir 4 via the second venturi ejector 22.

In the example described above of the drying of air the pressure of 11 barg (1.1 Mpa) in the second reservoir should be sufficient to drive the propylene glycol further downstream through the regeneration stage 9 of the circuit 3 without an extra pump, whereby a slight overpressure or atmospheric pressure remains in the first reservoir 4.

Instead of using only the first pump 11 in the circuit 3, it is not inconceivable to only provide the second pump 21 in the circuit 3, whereby in this case the regeneration step can take place in the regeneration stage 9 at an overpressure, while the purification step in the purification stage 8 occurs at a lower pressure.

Figure 2:
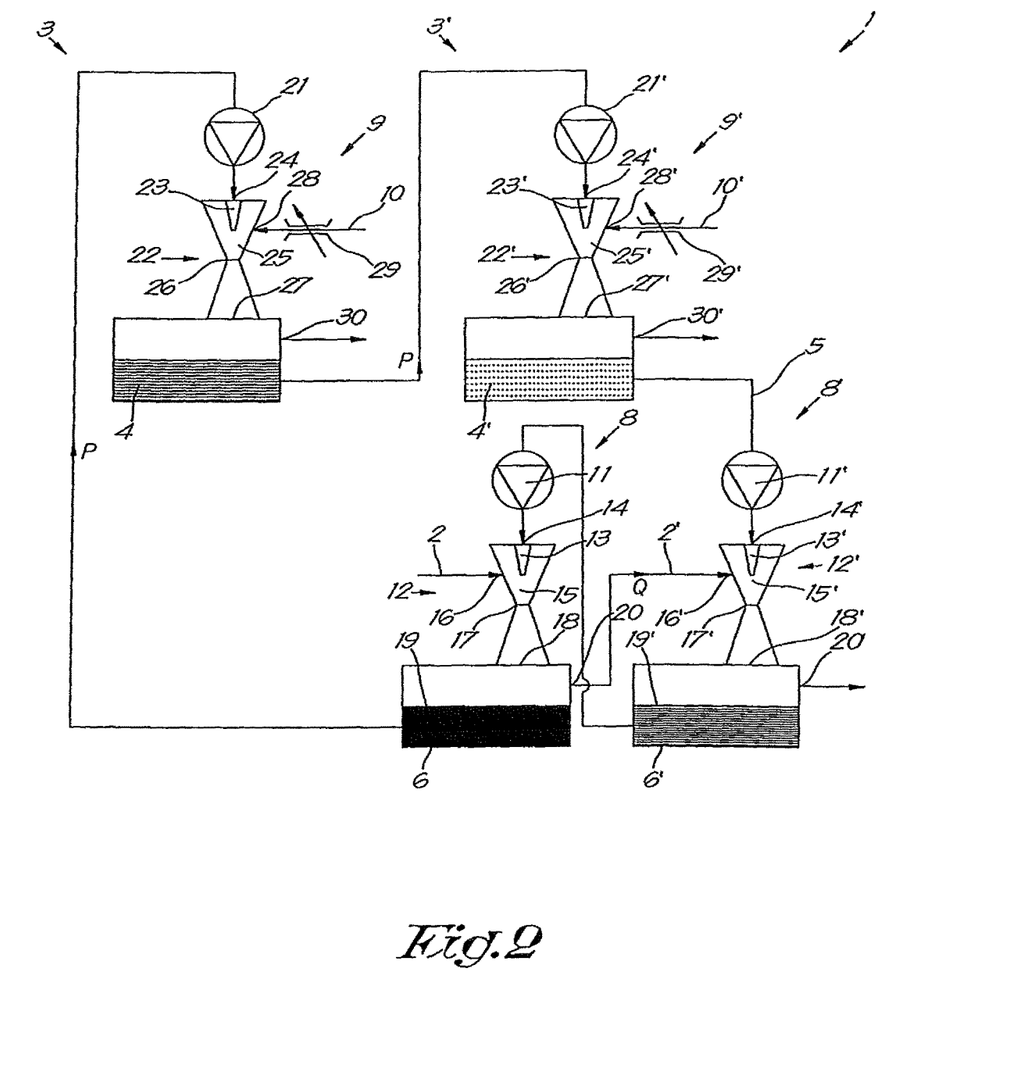
FIGS. 2 and 3 show a possible variant of a device according to the invention.

FIG. 2 shows a variant of a device 1 according to the invention whereby two purification stages 8 and 8' are connected in series in the circuit 3, followed by two regeneration stages 9 and 9' connected in series, whereby the first sorption medium is driven around the circuit 3 in liquid form in the flow direction P and whereby the purified gas is guided in the flow direction Q, in counterflow with respect to the flow direction P of the first sorption medium, through the purification stages 8 and 8' because the gas output 20 of the most downstream purification stage 8 is fed back to the gas input 16' of the purification stage 8' located more upstream.

In particular an additional purification step is applied in the additional purification stage 8' that makes use of an additional venturi ejector 12' followed by an additional reservoir 6' that are provided in the circuit 3 between the regeneration stage or stages 9 and the first venturi ejector 12, whereby the first sorption medium is pumped from the first reservoir 4 or the additional first reservoir 4' through the additional venturi ejector 12' to the additional reservoir 6', and whereby it is mixed with the at least partially purified gas mixture originating from the second reservoir 6 of the purification stage 8 from which the gas output 20 is connected to the gas input 16' of the additional venturi ejector 12', and whereby the further purified gas mixture is tapped off via the gas output 20' of the additional reservoir 6'.

Due to this counterflow feedback a more efficient purification can be realised.

It is clear that the additional purification can be done with a different purification technique such as gas washing in a gas washing column.

With regard to the regeneration, an additional regeneration stage 9' is used in FIG. 2 that makes use of an additional venturi ejector 22' followed by an additional first reservoir 4' that are provided in the circuit 5 between the first reservoir 4' and the purification stage or stages 8, whereby the first sorption fluid is pumped with the partly extracted gas to be extracted sorbed therein from the first reservoir 4 through the additional venturi ejector 22' to the additional reservoir 4', and whereby it is mixed with a gaseous second sorption medium whose supply is connected via a throttle valve 29' to the gas input 28' of the additional second venturi ejector 22', and whereby the second sorption medium with the gas to be extracted sorbed therein is blown out or tapped off from the additional reservoir 4' via the gas output 30'.

It is clear that the additional regeneration can be done with a different regeneration technique, such as by liquid stripping in a stripper column for example.

It is clear that the first sorption medium occurs in the different reservoirs with different concentrations of the sorbed gas to be extracted.

It is clear that more than two purification stages 8 and/or more than two regeneration stages 9 can be applied, with or without counterflow feedback.

It is also clear that the invention not only relates to a gas mixture of only two gases, but that mixtures of more than two gases can be purged of one or more component gases in the same way, either selectively or simultaneously.

Figure 3:
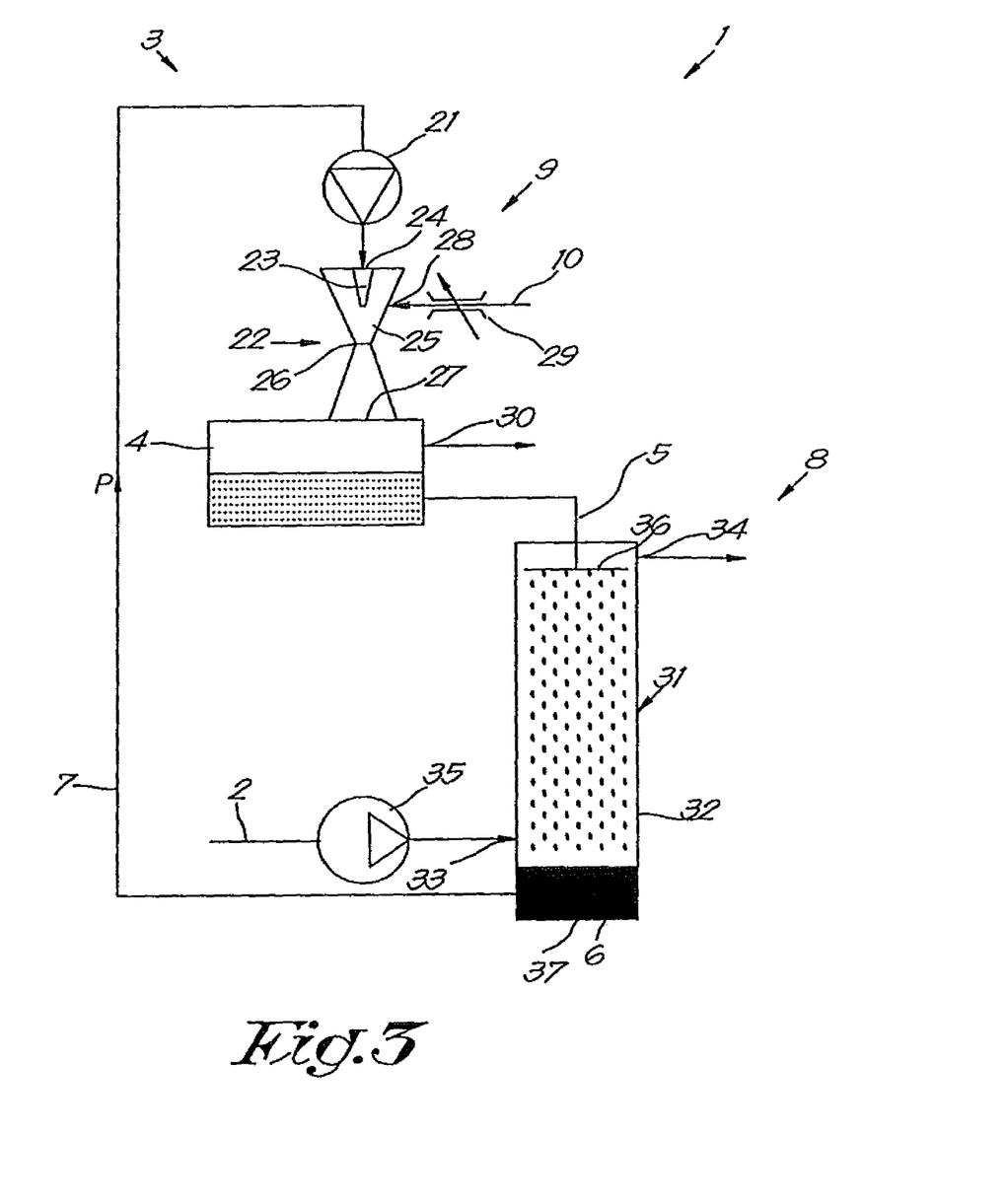

FIG. 3 shows another variant of a device 1 according to the invention that differs from the device 1 of FIG. 1 by the characteristic that the purification stage 8 with the first venturi ejector 12, pump 11 is replaced by a conventional 'gas washing column' 31 that is made up of a vertical closed column 32 in which the gas mixture to be purified is brought into contact with the first sorption medium from the first reservoir 4 via pipe 5 with the aim of extracting the gas to be extracted from the gas mixture, for example by absorption.

To this end the column 32 is provided with a gas input 33 and a gas output 34, whereby the gas mixture originating from the supply pipe 2 is driven upwards in the vertical direction through the column 32 to the gas output 34 by means of a compressor 35 or similar.

The liquid first sorption medium is distributed in counterflow at the top of the column 32 by means of a sprayer or atomiser 36 and falls downwards as a rain or mist due to gravity and it is received and collected at the bottom 37 of the column 32, whereby the column 32 as it were acts as a second reservoir 6 from where the enriched first sorption medium is pumped by the pump 21 of the regeneration stage 9 to the second venturi ejector 22 for regeneration as described above.

The advantages already discussed above of regeneration by means of a venturi ejector 22 are of course preserved, as well as the advantage of being able to realise the regeneration with ambient air as a second sorption medium in the case of the purification of a biogas.

It is clear that the expression first and second venturi ejector is only used to make a distinction between the venturi ejector of the purification stage and the venturi ejector of the regeneration stage and that it is not excluded that only a second venturi ejector can be present without a first venturi ejector being present, as shown in the example of FIG. 3.

The present invention is by no means limited to the embodiments described as an example and shown in the drawings, but such a device and method applied thereto can be realised in all kinds of variants, without departing from the scope of the invention.

The invention claimed is:

1. Method for extracting a gas from a gas mixture, wherein the method comprises the following steps:
   the provision of a liquid first sorption medium, which upon contact with the gas mixture can at least partially sorb the gas to be extracted;
   during a purification step, bringing this first sorption medium into contact with the gas mixture by guiding them together through a purification stage to have the gas to be extracted at least partially sorbed from the gas mixture by the first sorption medium due to the mutual contact, in order to be left with a purified gas mixture with less gas to be extracted and an enriched liquid first sorption medium in which the gas to be extracted from the gas mixture is at least partially sorbed;
   the provision of a gaseous second sorption medium that can at least partially extract the gas to be extracted from the enriched liquid first sorption medium upon contact with this enriched liquid sorption medium;
   during a regeneration step, bringing this gaseous second sorption medium into contact with the enriched liquid first sorption medium formed during the aforementioned purification step by guiding them together through a regeneration stage, whereby, due to the mutual contact, the sorbed gas to be extracted in the enriched first sorption medium is at least partially sorbed by the second sorption medium and whereby at the output of the regeneration stage an at least partially regenerated liquid first sorption medium is formed that can be reused for a subsequent purification step;
   whereby use is made of a venturi ejector with a liquid input and a gas input for the regeneration step, and whereby the enriched liquid first sorption medium originating from the purification step is supplied under pressure to the liquid input of this venturi ejector and the gaseous second sorption medium is drawn in via the gas input of this venturi ejector for the contact between the enriched first sorption medium and the second sorption medium.

2. Method according to claim 1, wherein use is made of a separate venturi ejector with a liquid input and a gas input for the purification step, whereby the first sorption medium is supplied under pressure to the liquid input of this venturi ejector and the gas mixture to be purified is drawn in via the gas input of this venturi ejector for the contact between the first sorption medium and the gas mixture.

3. Method according to claim 1, wherein the liquid first sorption medium is reused after the aforementioned regeneration step for a subsequent purification step.

4. Method according to claim 1, wherein it makes use of a circuit in which the liquid first sorption medium is guided around from a first reservoir through the purification stage in which the enriched first sorption medium is received from where it is driven by means of a second pump through the regeneration stage that leads to the aforementioned first reservoir in which the regenerated first sorption medium is received.

5. Method according to claim 4, wherein the method proceeds according to a continuous process whereby the liquid first sorption medium is guided around the circuit from the first reservoir via the purification stage and then back to the first reservoir via the regeneration stage, such that the gas mixture to be purified is continuously supplied to the purification stage and the purified gas from this purification stage is removed and the gaseous second sorption medium is drawn in continuously via the gas input of the venturi ejector of the regeneration stage.

6. Method according to claim 1, wherein the second sorption medium is drawn in via an either or not adjustable flow restriction by the venturi ejector of the regeneration stage to reduce the partial pressure of the gas to be extracted in the second sorption medium.

7. Method according to claim 1, wherein the first liquid sorption medium is heated for an endothermic extraction of the gas to be extracted, or cooled for an exothermic extraction of the gas to be extracted.

8. Method according to claim 1, wherein the pressure of the gas mixture with the gas to be extracted differs from the pressure of the gaseous second sorption medium.

9. Method according to claim 1, wherein the gas mixture to be purified is an untreated biogas that contains at least one of $CO_2$ and $H_2S$.

10. Method according to claim 9, wherein the first sorption medium is a liquid mixture of a more or less concentrated amine, amino salt or amino acid.

11. Method according to claim 1, wherein the first sorption medium is a liquid mixture of a liquid and solid particles.

12. Method according to claim 11, wherein the solid particles are iron oxide particles to remove $H_2S$ from the gas mixture to be purified by binding the sulphur to the iron into FeS that can be removed by filtering.

13. Method according to claim 9, wherein the second sorption medium is ambient air.

14. Method according to claim 1, wherein the gas mixture to be purified is a moist gas that must be dried and the first sorption medium is a hygroscopic liquid.

* * * * *

UNITED STATES PATENT AND TRADEMARK OFFICE
CERTIFICATE OF CORRECTION

PATENT NO. : 10,173,165 B2  
APPLICATION NO. : 14/430968  
DATED : January 8, 2019  
INVENTOR(S) : Peter Heirman and Geurt Aalderink Page 1 of 1

It is certified that error appears in the above-identified patent and that said Letters Patent is hereby corrected as shown below:

On the Title Page

Item (73), Delete the "," between "COPCO, AIRPOWER"

Signed and Sealed this  
Twenty-sixth Day of February, 2019

Andrei Iancu  
*Director of the United States Patent and Trademark Office*